(12) United States Patent
Bergenek et al.

(10) Patent No.: US 7,035,441 B2
(45) Date of Patent: Apr. 25, 2006

(54) CHECK FOR FINGERPRINTS

(75) Inventors: Jerker Bergenek, Lund (SE); Björn Nordin, Lund (SE)

(73) Assignee: Precise Biometrics AB, Lund (SE)

(*) Notice: Subject to any disclaimer, the term of this patent is extended or adjusted under 35 U.S.C. 154(b) by 719 days.

(21) Appl. No.: 09/842,672

(22) Filed: Apr. 27, 2001

(65) Prior Publication Data

US 2002/0050713 A1 May 2, 2002

Related U.S. Application Data

(60) Provisional application No. 60/210,636, filed on Jun. 9, 2000.

(30) Foreign Application Priority Data

Apr. 28, 2000 (SE) .................................... 0001581

(51) Int. Cl.
*G06K 9/00* (2006.01)

(52) U.S. Cl. ............... 382/124; 382/312; 340/5.8; 340/5.53; 713/185

(58) Field of Classification Search ........... 382/115, 382/116, 124, 125, 126, 127, 312; 235/380, 235/382, 382.5; 713/186, 185; 902/3–6; 340/5.2, 5.21, 5.52, 5.53, 5.8, 5.81, 5.82, 340/5.83

See application file for complete search history.

(56) References Cited

U.S. PATENT DOCUMENTS

| | | | | |
|---|---|---|---|---|
| 4,414,684 A | * | 11/1983 | Blonder | 382/127 |
| 4,794,260 A | * | 12/1988 | Asano et al. | 250/458.1 |
| 5,067,162 A | * | 11/1991 | Driscoll et al. | 382/126 |
| 5,078,426 A | * | 1/1992 | Reardon | 283/78 |
| 5,230,025 A | * | 7/1993 | Fishbine et al. | 382/127 |
| 5,313,265 A | * | 5/1994 | Hayes et al. | 356/511 |
| 5,428,683 A | * | 6/1995 | Indeck et al. | 713/176 |
| 5,509,083 A | * | 4/1996 | Abtahi et al. | 382/124 |
| 5,712,912 A | * | 1/1998 | Tomko et al. | 713/186 |
| 5,917,928 A | * | 6/1999 | Shpuntov et al. | 382/124 |
| 5,953,441 A | | 9/1999 | Setlak | |
| 6,535,622 B1 | * | 3/2003 | Russo et al. | 382/124 |
| 6,546,122 B1 | * | 4/2003 | Russo | 382/125 |

FOREIGN PATENT DOCUMENTS

| | | |
|---|---|---|
| EP | 0 918 300 A2 | 5/1999 |
| EP | 0 973 123 A1 | 1/2000 |
| SE | 9704925-8 | 6/2000 |
| WO | WO 96/41297 A1 | 12/1996 |
| WO | WO 99/51138 A2 | 10/1999 |

* cited by examiner

*Primary Examiner*—Sheela Chawan
(74) *Attorney, Agent, or Firm*—Buchanan Ingersoll PC

(57) ABSTRACT

In a method of preventing false acceptance in a system for checking fingerprints, a latent fingerprint on the sensor (1) is detected by the location of a currently recorded fingerprint being compared with the location of a previously recorded fingerprint. If the location essentially corresponds, the recorded fingerprint is considered as originating from a latent fingerprint, and the fingerprint is rejected. Otherwise, the fingerprint is considered as originating from an actual finger on the sensor.

23 Claims, 2 Drawing Sheets

CHECK FOR FINGERPRINTS

This application claims priority under 35 U.S.C. §§ 119 and/or 365 to Application No. 0001581-8 filed in Sweden on Apr. 28, 2000 and Provisional Application No. 60/210,636 filed in the United States of America on Jun. 9, 2000; the entire contents of which are hereby incorporated by reference.

TECHNICAL FIELD

The present invention relates to a method of preventing false acceptance in a system for checking fingerprints, which comprises a sensor. The invention also relates to a system for fingerprint checking, and a computer-readable storage medium.

BACKGROUND ART

It is known to use fingerprint checking systems to control access to a protected object, for example information or premises.

A fingerprint checking system can be divided broadly to into three parts—a sensor, a memory and a processor. The sensor is used to record fingerprints. The processor compares the fingerprint recorded by the sensor with a previously recorded reference fingerprint, what is known as a template, which is stored in the memory. If the recorded fingerprint corresponds to the reference fingerprint, the system accepts the recorded fingerprint and allows access to the protected object.

Two terms used within this field are FAR (False Acceptance Rate), in other words the frequency of false acceptances, and FRR (False Rejection Rate), in other words the frequency of false rejections. FAR is therefore a measure of the probability that an unauthorised person, whose fingerprint is not stored as a reference fingerprint in the system, will incorrectly gain access to the protected object, and FRR is a measure of the probability that an authorised person, whose fingerprint is stored as a reference fingerprint in the system, will incorrectly be denied access to the protected object. The ideal value of both terms is 0.

When a fingerprint sensor is used, a finger is placed against it. When the finger is removed from the sensor, traces of the fingerprint: may remain. These traces may be caused by the usually greasy surface of the finger, by other substances on the finger or by substances on the sensor, Such a residual fingerprint is referred to below as a latent fingerprint. A latent fingerprint constitutes a security problem because it can be intensified and in the worst case lead to false acceptance, in other words an unauthorised person gaining access to the protected object.

In many fingerprint checking systems, use is made of silicon sensors, also called capacitive sensors. A silicon sensor utilises information about a fingerprint having height differences and the finger having a specific resistance and a specific capacitance. In the event that there is a latent fingerprint on a silicon sensor, the sensor can be fooled into recording a fingerprint by breathing lightly on it or cupping a hand over it. If the latent fingerprint belongs to an authorised person, an impostor can in this way fool the system into granting him access to the protected object.

Optical sensors are another type of sensor used in fingerprint checking systems. An optical sensor records an image of the fingerprint if any part of the finger is located sufficiently close to the sensor surface. In this case, the law of total reflection applies. If there is a latent fingerprint on the optical sensor, the system can be fooled into recording and accepting a fingerprint in spite of the fact that there is no finger on the sensor by darkening the surface of the sensor. There is therefore a risk that an unauthorised person will in this way gain access to the protected object.

The problem with latent fingerprints may occur in any fingerprint sensor which requires the user's finger to be in touch with the sensor surface and which records the user's fingerprint by a single image. The problems associated with latent fingerprints thus mean that FAR has a high value.

SUMMARY OF THE INVENTION

One object of the invention is therefore to solve the above-mentioned problems.

This object is partly or fully achieved by a method according to claim 1, a system according to claim 12 and a storage medium according to claim 16.

According to a first aspect, the present invention thus relates to a method of preventing false acceptance in a system for checking fingerprints which comprises a sensor, comprising the step of detecting a latent fingerprint on the sensor.

Thus, according to the invention, the presence of a latent fingerprint on the sensor is detected, so that the latent fingerprint can be rejected. In this way, the risk is removed of an unauthorised person gaining access, by means of a latent fingerprint, to the protected object, for example information or a room, which is protected by the system for fingerprint checking. One advantage of this method is that it is simple and can be used in existing systems. Furthermore, it does not require any mechanical constructional changes. Nor does it require any complicated and time-consuming external treatment of the surface of the sensor in order to remove any latent fingerprints between recorded fingerprints.

As mentioned above, a latent fingerprint is a fingerprint which remains on the sensor after the finger to which it belongs has been removed from the sensor.

It should be stressed that the method does not prevent false acceptances, which occur due to other reasons than latent fingerprints. Thus it reduces the overall rate of false acceptance but prevents false acceptance due to latent fingerprints.

In one embodiment, the step of detecting a latent fingerprint comprises the steps of recording a fingerprint by means of the sensor and on the basis of the location of the recorded fingerprint on the sensor, evaluating whether the recorded fingerprint originates from a latent fingerprint on the sensor or from a finger placed on the sensor.

It would be possible to detect the latent fingerprint in various ways, for example by measuring the total light level. However; using the location of the fingerprint on the sensor has proved to be a simple and neat solution. This is because the probability of two people one after the other placing their finger in exactly the same place on the sensor is very low, in the order of 1 in 1000. If, however, somebody attempts to use a latent fingerprint in order to fool the system, the latent fingerprint will be situated in exactly the same place as the "authentic" fingerprint. This distinction can be used in order to evaluate whether a recorded fingerprint originates from a latent fingerprint or from an actual finger on the sensor.

In one embodiment, the evaluation step comprises, more specifically, comparing the location of the recorded fingerprint on the sensor with the location of a previously recorded fingerprint on the sensor.

This procedure is simple to implement, for example by means of a simple algorithm carried out in software or hardware. The location is easy to determine and the location of the previous fingerprint can be saved without a heavy requirement for memory space.

One embodiment also comprises the step of, if the location of the recorded fingerprint on the sensor and the location of the previously recorded fingerprint essentially correspond, considering the recorded fingerprint as originating from a latent fingerprint. In this case, the fingerprint is rejected, access to the system thus being denied.

It is to be pointed out that the recorded fingerprint can in certain embodiments be considered as originating from a latent fingerprint if the difference in location lies within a predetermined narrow range, for example one or two pixels. Complete identity is therefore not necessarily required, because the comparison algorithm can contain a degree of uncertainty.

It is usually sufficient to compare the recorded fingerprint with a single previously recorded fingerprint, because the latent fingerprint is destroyed when a new user places his finger against the sensor In one embodiment, the previously recorded fingerprint is the immediately preceding fingerprint which was considered as originating from a finger placed on the sensor. This means that the previously recorded fingerprint may belong to an unauthorised person and that latent fingerprints of both authorised and unauthorised persons can be detected.

In an alternative embodiment, the previously recorded fingerprint is the immediately preceding fingerprint which was accepted, in other words considered as originating from an authorised person whose reference fingerprint is stored in the system.

Thus, according to the latter alternative only fingerprints of authorised persons are stored as the previously recorded fingerprint. Thus, only latent fingerprints of authorised persons can be detected. If the latent fingerprint originates from an unauthorised person, the matching procedure can, however, take care of the rejection of the latent fingerprint so that it does not result in a false acceptance. Alternatively, the check for latent fingerprint is carried out after the matching procedure, so that only fingerprints accepted by the matching procedure are tested.

One embodiment also comprises the step of storing the location of the recorded fingerprint on the sensor in the event that the recorded fingerprint is not considered as originating from a latent fingerprint.

The location of the recorded fingerprint may replace a previously stored location of a previously recorded fingerprint. The fingerprint with which comparison is carried out for detection of a latent fingerprint may therefore be changed continuously. Temporary storage of only one previously recorded fingerprint at a time is thus sufficient for the purpose of detecting latent fingerprints.

In one embodiment, the location of a fingerprint on the sensor may be stored in a memory when the fingerprint is accepted as belonging to an authorised person. The location of this fingerprint may then be used for comparison with the location of later recorded fingerprints until a new fingerprint is accepted. When the new fingerprint is accepted, the location of the previous fingerprint on the sensor is no longer required, and the location of the new accepted fingerprint can replace that of the previous one.

It is to be stressed that it is the location of the fingerprint in the coordinate system of the sensor which is stored. The entire previously recorded fingerprint can, but does not have to, be stored. In a memory-saving embodiment, the location of only certain partial areas or certain points of the fingerprint is stored e.g. in the form of coordinates.

In one embodiment, the step of comparing the location of the recorded fingerprint on the sensor with the location of a previously recorded fingerprint comprises comparing the location on the sensor of at least one feature of the recorded fingerprint with the location of the corresponding feature of the previously recorded fingerprint.

A common method used for fingerprint checking is feature matching. In this method, a number of specific features are compared in order to decide whether a recorded fingerprint corresponds to a reference fingerprint and thus originates from an authorised person One One or more such specific features can also be used in order to detect a latent fingerprint. More specifically, the locations of these features on the sensor are compared for the current recorded fingerprint and the previously recorded fingerprint. If the features are located in the same or essentially the same place on the sensor in the two fingerprints compared, the current recorded fingerprint is considered as originating from a latent fingerprint. A feature may be, for example, the end of a fingerprint line or a split of a fingerprint line.

An alternative method used in fingerprint checking is to match partial areas in a reference fingerprint against a current recorded fingerprint in order to check whether the partial areas are present in it and the recorded fingerprint thus originates from an authorised person. Partial areas can also be used for detection of latent fingerprints, checking being effected on the basis of the location of the partial areas on the sensor for the current and the previously recorded fingerprint. This alternative has the advantage that it is more reliable than the method using specific features because, when the location of partial areas on the sensor is compared, it is known with greater certainty that corresponding areas are actually being compared.

Thus, in one embodiment the step of comparing (130) the location of the recorded fingerprint on the sensor with the location of a previously recorded fingerprint comprises comparing the location on the sensor of a partial area of the recorded fingerprint with the location of a corresponding partial area of the previously recorded fingerprint.

As a further alternative, the location of the entire fingerprint can be compared, e.g. by separating the foreground and the background of the fingerprints so that the locations of the contours of the fingerprints may be compared or by matching the whole fingerprints A further embodiment may comprise the step of matching (110) at least one partial area of a reference fingerprint with the recorded fingerprint to obtain at least one matching partial area of the recorded fingerprint, wherein the step of comparing the location of the recorded fingerprint on the sensor with the location of a previously recorded fingerprint comprises comparing the location on the sensor of the matching partial area with the location of the corresponding partial area of the previously recorded fingerprint.

The reference fingerprint is a previously stored fingerprint which belongs to an authorised person. The reference fingerprint does not have to be a complete fingerprint but can be a processed form thereof, what is known as a template The template can comprise e.g. partial areas of the reference fingerprint or specific features and their location.

It is to be pointed out that a plurality of reference fingerprints are usually stored, because there is often more than one authorised person for the protected object which the fingerprint checking system protects. However, it is also possible for only one reference fingerprint to be stored.

In one embodiment, the comparison of the location of the recorded fingerprint on the sensor with the location of a previously recorded fingerprint is carried out only in the event that a matching between a reference fingerprint and the recorded fingerprint reveals that the recorded fingerprint originates from an authorised person.

According to this method, matching of the recorded fingerprint is carried out first. Only if a reference fingerprint is found, which corresponds to the recorded fingerprint is the location of the recorded fingerprint on the sensor checked against the location of a previously recorded fingerprint on the sensor so as in this way to decide whether the fingerprint is a latent fingerprint or not. Location checking is thus not carried out if the fingerprint is rejected on account of it not being considered as originating from an authorised person.

According to a second aspect, the invention relates to a system for fingerprint checking comprising a sensor, the system being arranged to detect a latent fingerprint on the sensor so as to prevent false acceptance.

According to a third aspect, the invention relates: to a storage medium for digital information; which is readable for a computer system, the storage medium containing a computer program for preventing false acceptance in a system for checking fingerprints, said program defining the method in any one of claims 1–11.

What has been said above about the method also applies, where appropriate, to the system and the storage medium.

BRIEF DESCRIPTION OF THE DRAWINGS

The invention will be described in greater detail below with reference to the accompanying drawings, in which.

DESCRIPTION OF A PREFERRED EMBODIMENT

Figure 1:
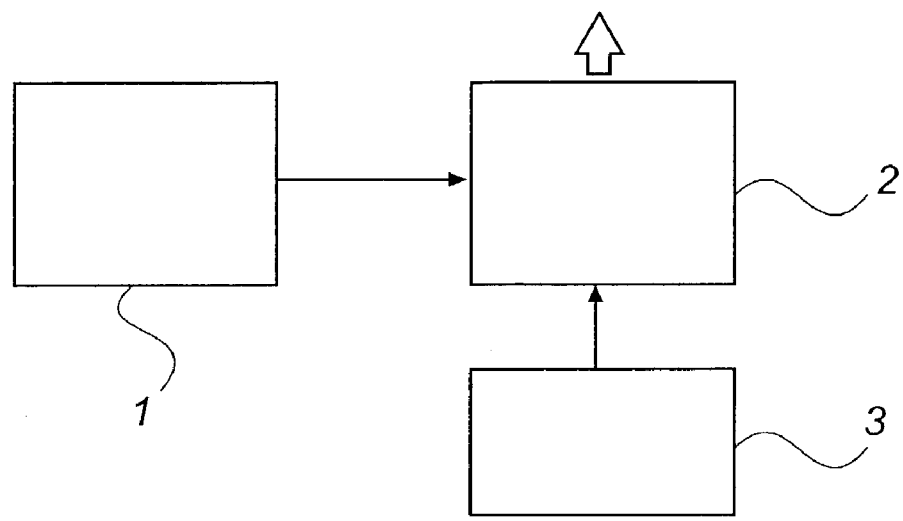
FIG. 1 shows schematically an embodiment of a system for fingerprint checking.

FIG. 1 shows schematically a system for fingerprint checking The system comprises essentially a sensor 1, comparison means 2 and a memory 3. The sensor 1 is arranged to record a fingerprint from a finger which is placed on the sensor, and to feed this to the comparison means 2. The sensor 1 can be of, for example, the capacitive or optical type. It has an integral coordinate system.

The comparison means 2 can take the form of hardware or software and, for example, include a microprocessor with suitable programs or a specifically adapted hardware, e.g. an ASIC (Application Specific Integrated Circuit) or an FPGA (Field Programmable Gate Array). The output signal from the comparison means indicates in some manner whether the fingerprint recorded by the sensor is accepted, in other words that it originates from an authorised person whose reference fingerprint is stored in the memory, or is rejected, in other words that it originates from an unauthorised person or is evaluated as originating from a latent fingerprint or cannot be accepted for another reason. The output signal can be used internally in the system, e.g. as a basis for creating a lock-up signal or an access signal for a protected object, or be sent to an external unit, e.g. a display.

Stored in the memory 3 is/are one or more reference fingerprint(s) which is/are recorded under secure circumstances from one or more authorised people who is/are entitled to have access to the protected object which is protected by the system. The memory may be permanently connected to the comparison means 2 or temporarily connected. In the latter case it may consist of a smart card or similar portable data carrier.

The recording of a reference fingerprint may be carried out as follows. The sensor captures a greyscale digital image of a fingerprint. A quality check is carried out to ensure that the sensor is capable of distinguishing between "ridges" and "valleys" on the finger. Then the image is binarised. Binarisation means that the pixels of the image are compared with a greyscale threshold value. Those pixels which have a value smaller than the greyscale threshold value are converted to white and those which have a value greater than the greyscale threshold value are converted to black.

After binarisation, a number of partial areas of the image are selected for storage as a processed form of the reference fingerprint, also called a template. One of the partial areas is selected so as to lie fairly centrally in the fingerprint. The others, the number of which usually varies between four and eight depending on the level of security required, can have varying positions in relation to the central area. The size of the partial areas selected can be 48×48 pixels but can easily be adapted by the person skilled in the art according to existing requirements. The various partial areas can be found by searching the image for areas with as much individual-specific information as possible. Areas with curved lines, for example, are of greater interest than areas with straight parallel lines. The template, which also comprises the relative locations of the other partial areas in relation to the central area, is then stored in the memory 3.

Figure 2:
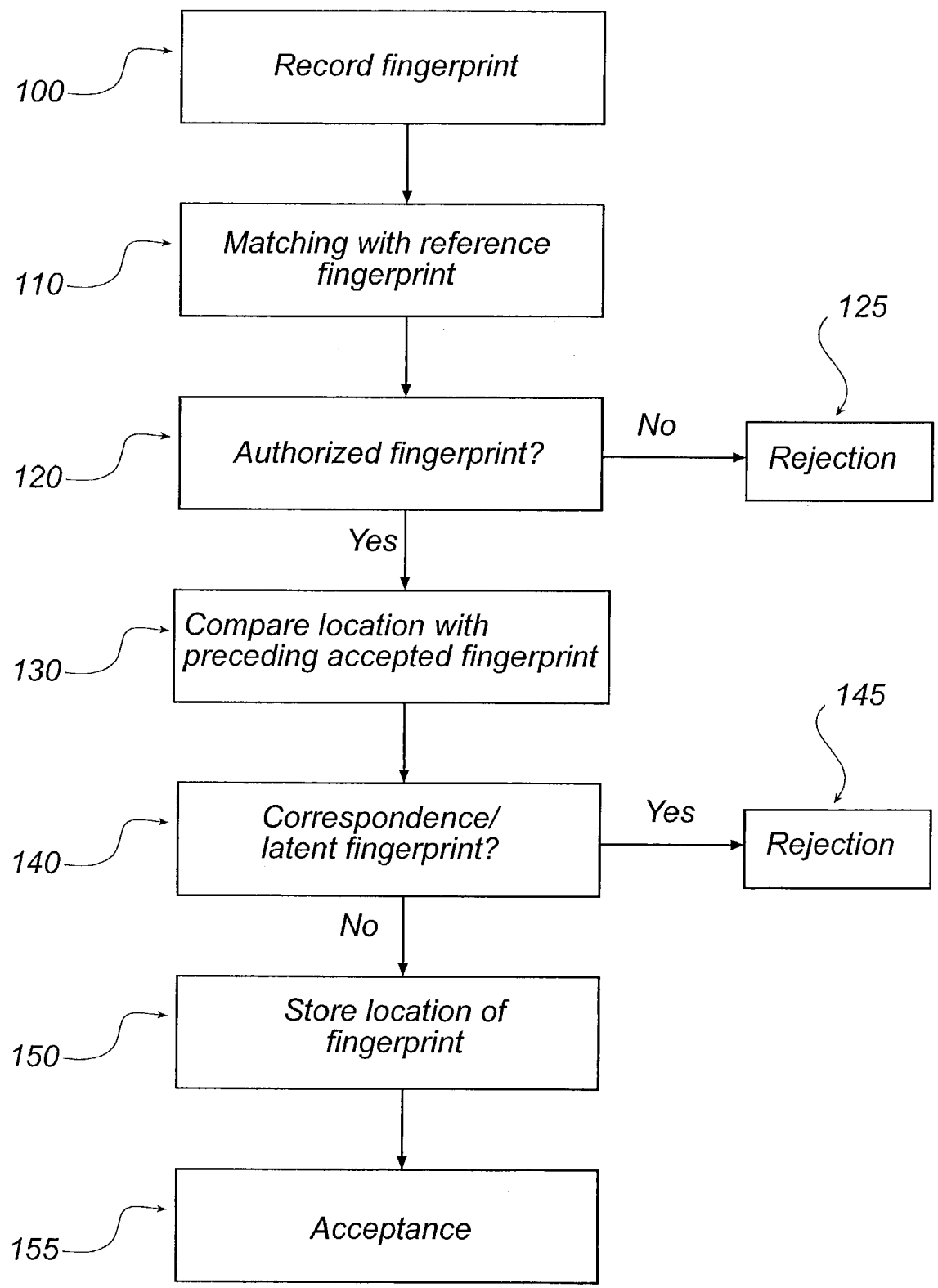
FIG. 2 is a flow diagram of an embodiment of the method according to the invention.

The flow chart of FIG. 2 shows how fingerprint checking is carried out when a user wishes to have access to the protected object, for example sensitive information or a locked passage, to which the system can grant access by fingerprint checking The user places his finger on the sensor 1, and a digital sample image of the fingerprint is recorded in a recording step 100 in the same manner as above when the template was recorded, apart from the fact that no areas are initially selected. After recording, the sample fingerprint therefore has a format which makes possible comparison with the template which is stored in the memory 3.

The comparison means 2 are arranged to receive the recorded sample fingerprint and match it in a matching step 110 with the reference fingerprints stored in the memory 3. During matching, it is in this case checked whether the partial areas of the template are present in the recorded fingerprint. More particularly, the central partial area of the template is matched against a central part of the recorded sample fingerprint. If a match is obtained, the relative location information of the template is used to select partial areas of the sample fingerprint. The partial areas of the sample fingerprint are selected to have the same relative locations with regard to the matching partial area of the sample fingerprint as have the other partial areas of the template with regard to the central partial area of the template. Finally, the partial areas of the template are matched against the selected partial areas of the sample fingerprint to determine whether a matching requirement is fulfilled. If so, the recorded sample fingerprint is considered as originating from an authorised person.

PCT/SE99/00553 describes a slightly different method for selecting the part areas of the sample fingerprint.

If the recorded fingerprint is not considered as originating from an authorised person, step 120, the fingerprint is rejected, step 125. If, however, it is considered as originating from an authorised person, the method continues with a check of whether the fingerprint may be a latent fingerprint.

More specifically, the location on the sensor 1 of the recorded sample fingerprint is compared, in step 130, with the location on the sensor 1 of the immediately preceding accepted fingerprint. In this connection, use is made of those partial areas of the recorded sample fingerprint which in step 110 were considered as matching the partial areas in the reference fingerprint. The locations of these matching partial areas in the coordinate system of the sensor are determined, for example the central points of the partial areas can be used, and are compared with the locations of corresponding partial areas of the previously recorded fingerprint. If the location of at least one partial area is the same, step 140, the recorded fingerprint is considered as being located in the same place as the previously recorded fingerprint. The result is that the recorded fingerprint is rejected, step 145, on account of the fact that it is considered to be a latent fingerprint. It should be stressed that also partial areas, the locations of which deviate with one or a few pixels, may be considered as being located in the same place.

If none of the partial areas is located in the same place, the recorded fingerprint is considered as originating from an actual finger on the sensor. The locations on the sensor of the matching partial areas in the recorded fingerprint are then stored in the memory 3, step 150, as the location of a previously recorded fingerprint. More specifically, the coordinates of each of the partial areas are stored. The coordinates may be the coordinates of one or more predetermined points in the partial areas, e.g. the central points or the corner points. The storage is only temporary and lasts only until a later recorded fingerprint is processed in step 150.

Finally, the recorded fingerprint is accepted in step 155 as a fingerprint of an authorised person, and the system signals this appropriately, for example by means of a simple OK signal or a control signal which allows access to a protected object, for example a room or a computer.

Figures 3A, 3B:
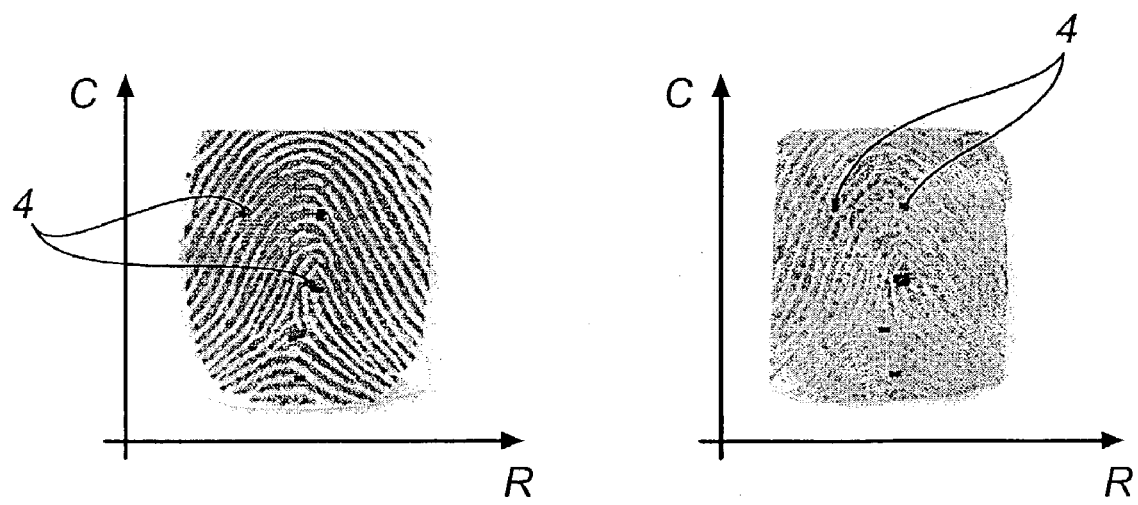
FIG. 3a shows an actual fingerprint.
FIG. 3b shows a latent fingerprint.

FIG. 3a schematically shows a first image of an actual fingerprint recorded from a finger on a sensor. In the fingerprint, the location of the central points 4 of five partial areas are marked. FIG. 2b shows a second image of a recorded fingerprint which originates from a latent fingerprint, which remained on the sensor after recording of the fingerprint in FIG. 3a. In FIG. 3b, the same partial areas have been found and the central points thereof are marked. Alternatively, the points 4 could illustrate the location on the sensor of corresponding features. The fingerprint images are shown in a respective coordinate system, where R is the row coordinate axis and C is the column coordinate axis, to schematically indicate that the locations of the points 4 are the same. It is sufficient for the location of one point (for example the coordinates of the central point of one partial area or the coordinates of one feature) to correspond in the two fingerprints compared in order to consider the location of the fingerprints as corresponding.

The comparison can be carried out by comparing the coordinates of the points, and, if they are the same or essentially the same, the current fingerprint is considered as being a latent fingerprint which originates from the preceding fingerprint, and the fingerprint is rejected. It has been found that a good limit value is if the test points are separated by fewer than two pixels in the x direction and the y direction. The limit value is then compared with all the test points.

The comparison can be carried out as follows (semi program code):

For I=1 to number of points
Do
  If abs(R1I−R2I)<2 and abs(C1I−C2I)<2
  Then
  Latent Fingerprint present
    Exit
    End
End
Exit Where R1I is the row coordinate of point I of the first image, R2I is the row coordinate of point I of the second image, C1I is the column coordinate of point I of the first image, and C1I is the column coordinate of point I of the second image, If there are no time constraints, the entire image or the entire detailed pattern can be compared.

Alternative Embodiments

Although a special embodiment of the invention has been described above, it is evident for the person skilled in the art that many alternatives, modifications and variations are possible in the light of the above description.

FIG. 1 shows the sensor 1, the comparison means 2 and the memory 3 as separate physical units which are interconnected by means of lines. Other variants are also possible. The sensor 1 and the comparison means 2 can, for example, be integrated with one another and located in the same physical unit which is connected to the memory 3 which is located in another physical unit. The sensor 1, the comparison means 2 and the memory 3 can also all be integrated in a single physical unit.

In a further alternative, the memory 3 consists of a data carrier in the form of a personal card, e.g. a smart card, on which the fingerprint of the owner is stored in electronic form so that it can be read into the comparison means 2 via a reader which can be located in the same physical unit as the sensor and the comparison unit.

It is also possible for the system to have a plurality of sensors 1 which are connected to a central unit which contains the memory 3 for storing reference fingerprints and the comparison means 2. The system can contain a special reference sensor for recording reference fingerprints.

The fingerprint can be stored in the form of a bit map. An efficient algorithm for matching bit maps is described in Applicant's Swedish Patent Application SE 9704925-8.

Above, the matching of fingerprints has been described as based on the comparison of partial areas of a current fingerprint with partial areas of a template. Alternatively, it may, however, be based on the comparison of specific features, also called minutiae points, of the current fingerprint and the template.

Furthermore, the detection of a latent fingerprint has been described as based on the comparison of the locations on the sensor of partial areas in a current fingerprint with the locations on the sensor of partial areas in a previously recorded fingerprint The detection can however also be carried out on the basis of the locations of corresponding features.

Another alternative is to extract the contour of the current fingerprint and to compare its location on the sensor with the location 0 the sensor of a contour of a previously recorded fingerprint.

Yet another alternative is to match the entire current fingerprint to the entire previously recorded fingerprint and to determine whether they are located in the same position on the sensor.

In the above-described embodiment, the location of the previously recorded fingerprint is stored in the memory 3, which may be a memory permanently or temporarily connected to the comparison means 2. However, the location of the previously recorded fingerprint may also be stored in a memory in the sensor or in the same hardware component as the sensor. The advantage with this is that the system cannot be fooled by a switch of sensors. Alternatively, the location of the previously recorded fingerprint can be stored in conjunction with the template used for matching of the previously recorded fingerprint. Next time this particular template is used for matching, the location of the sample fingerprint is checked against the location of the previously recorded fingerprint stored in conjunction with the template to evaluate whether the sample fingerprint is a latent fingerprint.

The invention claimed is:

1. A method of preventing false acceptance in a system for checking fingerprints which comprises a sensor, said method comprising:
   recording a fingerprint with the sensor; and
   evaluating whether the recorded fingerprint originates from a latent fingerprint on the sensor or from a finger placed on the sensor on the basis of the location of the recorded fingerprint on the sensor in relation to an integral coordinate system of the sensor.

2. A method according to claim 1, wherein the evaluation step comprises comparing the location of the recorded fingerprint on the sensor with the location of a previously recorded fingerprint on the sensor.

3. A method according to claim 3, wherein the previously recorded fingerprint is the immediately preceding fingerprint which was considered as originating from a finger placed on the sensor.

4. A method according to claim 2, wherein the previously recorded fingerprint is the immediately preceding fingerprint which was accepted.

5. A method according to claim 2, wherein the step of comparing the location of the recorded fingerprint on the sensor with the location of a previously recorded fingerprint comprises comparing the location on the sensor of at least one feature of the recorded fingerprint with the location on the sensor of the corresponding feature of the previously recorded fingerprint.

6. A method according to claim 2, wherein the step of comparing the location of the recorded fingerprint on the sensor with the location of a previously recorded fingerprint comprises comparing the location on the sensor of a partial area of the recorded fingerprint with the location of a corresponding partial area of the previously recorded fingerprint.

7. A method according to claim 2, further comprising the step of matching at least one partial area of a reference fingerprint with the recorded fingerprint to obtain at least one matching partial area of the recorded fingerprint, wherein the step of comparing the location of the recorded fingerprint on the sensor with the location of a previously recorded fingerprint comprises comparing the location on the sensor of the matching partial area with the location of the corresponding partial area of the previously recorded fingerprint.

8. A method according to claim 3, further comprising the step of, if the location of the recorded fingerprint on the sensor and the location of the previously recorded fingerprint essentially correspond, considering the recorded fingerprint as originating from a latent fingerprint.

9. A method according to claim 2, further comprising the step of storing information about the location of the recorded fingerprint on the sensor if the recorded fingerprint is not considered as originating from a latent fingerprint.

10. A method according to claim 1, further comprising the step of, if the location of the recorded fingerprint on the sensor and the location of the previously recorded fingerprint essentially correspond, considering the recorded fingerprint as originating from a latent fingerprint.

11. A method according to claim 10, wherein the previously recorded fingerprint is the immediately preceding fingerprint which was considered as originating from a finger placed on the sensor.

12. A method according to claim 10, wherein the previously recorded fingerprint is the immediately preceding fingerprint which was accepted.

13. A method according to claim 1, further comprising the step of storing information about the location of the recorded fingerprint on the sensor if the recorded fingerprint is not considered as originating from a latent fingerprint.

14. A method according to claim 1, wherein the comparison of the location of the recorded fingerprint on the sensor with the location of a previously recorded fingerprint is carried out only in the event that a matching between a reference fingerprint and the recorded fingerprint reveals that the recorded fingerprint originates from an authorised person.

15. A storage medium for digital information, which medium is readable for a computer system, the storage medium containing a computer program for preventing false acceptance of fingerprints, wherein said program implements the method in claim 1.

16. A system for fingerprint checking comprising a sensor, wherein the system is arranged to detect a latent fingerprint on the sensor so as to prevent false acceptance, and wherein the sensor has an integral coordinate system.

17. A system according to claim 16, wherein the system is further arranged to record a fingerprint by means of the sensor and, on the basis of the location of the recorded fingerprint on the sensor, evaluate whether the recorded fingerprint originates from a latent fingerprint on the sensor or from a finger placed on the sensor.

18. A system according to claim 17, wherein the system further comprises a comparison means for comparison of the location of a recorded fingerprint on the sensor with the location of a previously recorded fingerprint on the sensor.

19. A method of preventing false acceptance in a system for checking fingerprints which comprises a sensor, said method comprising:
   recording a fingerprint with the sensor; and
   evaluating whether the recorded fingerprint originates from a latent fingerprint disposed on the sensor or from a subsequent fingerprint disposed on the sensor on the basis of the location of the recorded fingerprint on the sensor in relation to an integral coordinate system of the sensor.

20. A method according to claim 19, wherein the subsequent fingerprint corresponds to that of a finger in contact with the sensor at the time the recorded fingerprint is recorded by the sensor.

21. A system for fingerprint checking comprising:
   a sensor having an integral coordinate system; and
   a processing unit coupled to the sensor,
   wherein the system is configured to record a fingerprint using the sensor; and wherein the processing unit is configured to evaluate whether the recorded fingerprint originates from a latent fingerprint disposed on the sensor or from a subsequent fingerprint disposed on the sensor on the basis of the location of the recorded fingerprint on the sensor in relation to the integral coordinate system of the sensor.

22. A system according to claim 21, wherein the processing unit is configured to compare the location of the recorded fingerprint on the sensor with the location of a previously recorded fingerprint on the sensor.

23. A system according to claim 21, wherein the subsequent fingerprint corresponds to that of a finger in contact with the sensor at the time the recorded fingerprint is recorded by the sensor.

* * * * *